United States Patent [19]

Furuichi

[11] 4,341,276
[45] Jul. 27, 1982

[54] FRAME STRUCTURE FOR CONSTRUCTION VEHICLES

[75] Inventor: Takeshi Furuichi, Ibaraki, Japan

[73] Assignee: Hitachi Construction Machinery Co., Ltd., Tokyo, Japan

[21] Appl. No.: 172,180

[22] Filed: Jul. 25, 1980

[30] Foreign Application Priority Data

Jul. 27, 1979 [JP] Japan .................................. 54/94948

[51] Int. Cl.³ ............................................. B62D 55/00
[52] U.S. Cl. ............................ 180/9.48; 180/DIG. 2; 212/189
[58] Field of Search ....................... 280/781, 766, 763; 180/9.48, DIG. 2; 212/189

[56] References Cited

U.S. PATENT DOCUMENTS

| | | | |
|---|---|---|---|
| 1,705,578 | 3/1929 | Lichtenberg | 180/9.48 |
| 3,154,164 | 10/1964 | Shaw et al. | 180/DIG. 2 |
| 3,990,529 | 11/1976 | Bartels | 180/9.48 |
| 3,998,286 | 12/1976 | Ponikelsky et al. | 180/9.48 |

*Primary Examiner*—Joseph F. Peters, Jr.
*Assistant Examiner*—Ross Weaver
*Attorney, Agent, or Firm*—Craig and Antonelli

[57] ABSTRACT

A track structure for a construction vehicle having a lower frame and a pair of track frames connected to the lower frame, in which a pair of beams of an elongated box shape which constitutes a part of the lower frame extends substantially horizontally crosswise of the vehicle. Each of opposite end portions of each beam is inserted between two bracket plates secured on an upper surface of each track frame. The end portion of the beam is fastened to the two bracket plates by removable pins horizontally extending therethrough. The beam is closed at opposite ends thereof. The bracket plates extend vertically upwardly and are disposed parallel to the beam.

6 Claims, 7 Drawing Figures

FRAME STRUCTURE FOR CONSTRUCTION VEHICLES

BACKGROUND OF THE INVENTION

This invention relates to frame structures for construction vehicles in general, and more particularly it deals with a frame structure for construction vehicles suitable for use in construction or civil engineering work which require adjustments of the width of the vehicles to be effected.

A construction vehicle suitable for use in construction work equipped with a pair of endless tracks each track disposed on one of opposite sides of the vehicle body and having a bucket or. other operating tool mounted thereon, such as an excavator, is generally referred to as a crawler vehicle. In order that tumbling of the vehicle body may be avoided during operation, such crawler vehicle must be able to adjust the distance between the two endless tracks (hereinafter referred to as a vehicle body width) in such a manner that the vehicle body width can be increased when the vehicle is in an operation mode, while the vehicle body width can be reduced to a level within the limits suitable for transportation according to government regulations when the vehicle is in a transportation mode for transportation to a faraway destination.

To this end, various frame structures have been proposed which are provided with vehicle body width adjusting devices. For example, Japanese Utility Model Application Laid-Open Number 156035/77 discloses a frame structure including a vehicle body width adjusting device. However, such a frame structure suffers the following disadvantages:

(1) The frame structure comprises elongated box-shaped members mounted on a lower frame, and support legs mounted on a pair of track frames disposed on opposite sides of a vehicle body and each supporting one of the elongated box-shaped members while being inserted in the elongated box-shaped member. With this frame structure, it is necessary to machine with precise finishes four surfaces or upper and lower surfaces and left and right surfaces of each of the support legs (outer peripheral surfaces) and each of the elongated box-shaped members (inner peripheral surfaces). This machining operation is time consuming and involves great expenses. Particularly, machining of the inner peripheral surfaces of the elongated box-shaped members is troublesome and time consuming, and difficulties are experienced in increasing the precision with which machining is effected.

(2) The elongated box-shaped members each have the support legs inserted in opposite ends thereof. Thus the opposite ends of each elongated box-shaped member should be open. This construction is very low in strength with respect to torsion loads, so that it becomes necessary to increase the size of the cross-sectional area or increase the thickness of plates of the member to increase strength. Moreover, the elongated box-shaped member and the support legs overlap one another in part of them, thereby increasing weight. Thus an incease in weight caused by the need to increase strength and an increase in weight due to the presence of overlaps combine to cause a large increase in the weight of the frame structure, thereby increasing cost.

(3) The bending moment applied to the lower frame and the track frames connected to one another during operation of a vehicle will be discussed. Assuming that a load F is equally divided into F/2 and F/2 which are each borne by one of the left and right track frames, the bending moment would be maximized near the central portion of the frame and minimized at opposite ends thereof. The elongated box-shaped member is connected by bolts at opposite ends thereof to the support legs in a position near the portion of the frame in which the bending moment is maximized, so that the need arises to increase the strength of the connections.

(4) As stated in paragraph (1), difficulties are encountered in increasing the precision with which the elongated box-shaped members are finished, and this makes it necessary to provide a large clearance between sliding portions of the elongated box-shaped member and the associated support legs. In this case, they are clamped together by bolts to prevent relative movements therebetween. However, loads would be applied to the bolts by the weight of the vehicle body, reactions produced during operation (such as reactions of excavation operation) and impacts applied during travel, so that shearing, bending, tensile and other forces would act on the bolts. As a result, the bolts would tend to be loosened or broken. When the bolts are loosened or broken, relative movements would occur between the elongated box-shaped member and the support legs during operation or travel, so that the performance, stability and riding comfort of the vehicle would be adversely affected.

(5) As stated in paragraph (4), a clearance should be provided between the sliding portions of the elongated box-shaped member and the support legs and they should be clamped together by bolts to avoid relative movements therebetween. In this case, the bolts used should be increased in number and the clamping torque of the bolts should also be increased greatly because the relative movements caused by a horizontal load in particular should be absorbed by friction between the elongated box-shaped member and the support legs. Thus clamping should be effected by using a wrench of large size and heavy weight or other similar tool. Being large and heavy, such wrench is difficult to operate. Als it often happens that the clamping operation should be performed in places of inconvenience for operation. This increases the time required for effecting vehicle body weidth adjustments to about 5 hours in the case of a crawler vehicle of a bucket capacity of 2 $m^3$ class, for example.

SUMMARY OF THE INVENTION

This invention has been developed for obviating the aforesaid disadvantages of the prior art. Accordingly, the invention has as its object the provision of a frame structure for a construction vehicle, which is simple in construction and low in cost and enables vehicle body width adjustments to be readily effected.

According to the invention, there is provided a frame structure for a construction vehicle having a lower frame and a pair of track frames connected to the lower frame, said track structure comprising a pair of beams of an elongated box shape constituting a part of said lower frame and extending substantially horizontally crosswise of the vehicle, bracket means secured to an upper surface of each of said track frame and receiving each of opposite end portions of each of said beams, and pin means for fastening said each end portion of said each beam to said bracket means thereby to connect said lower frame to said track frames.

Preferably, said each beam is closed at opposite ends thereof.

In one preferred embodiment, said bracket means may include a pair of vertically upwardly extending plates disposed parallel to said each beam and receiving said each end portion of said each beam therebetween, and said pin means includes at least one removable pin extending horizontally through said bracket plates and said beam. The pin means may include a plurality of horizontally arranged, pin receiving holes formed in said each end portion of said each beam and equidistantly spaced apart from one another, a plurality of horizontally arranged, pin receiving holes formed in said bracket means and equidistantly spaced apart from one another with the same spacing interval as said pin receiving holes formed in said each beam, and at least one removable pin selectively inserted in one of said pin receiving holes of said beam and one of said pin receiving holes of said bracket means, said pin receiving holes of said each beam and said bracket means having said at least one removable pin inserted therein being adapted to be varied at least in part from each other thereby to allow the vehicle body width to be altered when the vehicle is switched between an operation mode and a transportation mode. Preferably, said pin receiving holes formed in said beam include two holes formed on either side of each end portion thereof and said pin receiving holes formed in said bracket plates include three holes formed in each said bracket plate. Said pin receiving holes formed in said beam may include two holes formed on either side of each end portion thereof and said pin receiving holes formed in said bracket plates may include two holes formed in each said bracket plate.

In another preferred embodiment, the frame structure may further comprise at least one support plate attached to the upper surface of said each track frame and interposed between said two bracket plates, said support plate having a thickness slightly smaller than the clearance between the upper surface of said track frame and the undersurface of said beam.

DESCRIPTION OF THE PREFERRED EMBODIMENTS

Before describing in detail the preferred embodiments of the frame structure in conformity with the invention, one example of the frame structures of the prior art will be outlined, to enable the features and advantages of the present invention to be better understood.

Figure 1:
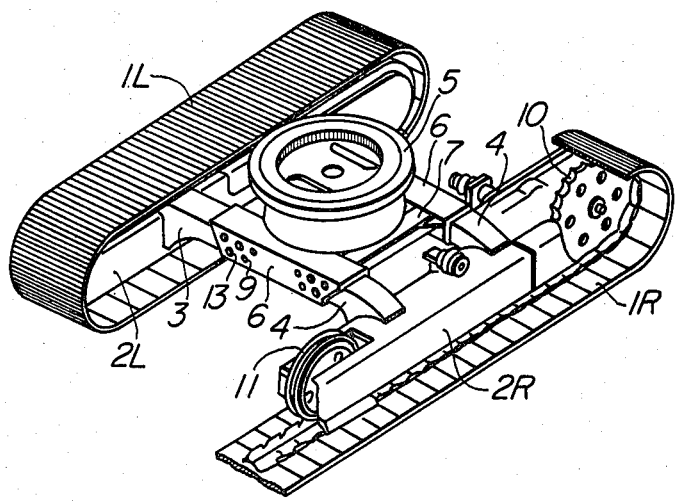
FIG. 1 is a perspective view of the frame structure of a crawler vehicle of the prior art suitable for construction work or civil engineering work.
Figure 2:
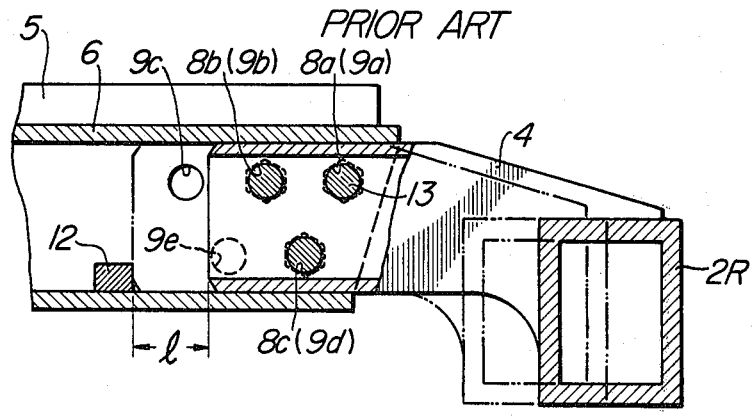
FIG. 2 is a sectional view of the essential portion providing a vehicle width adjusting device of the frame structure shown in FIG. 1.

FIG. 1 is a perspective view of a frame structure of a crawler vehicle of the type disclosed in Japanese Utility Model Application Laid-Open Number 156035/77, and FIG. 2 is a sectional view of the essential portions providing a vehicle body width adjusting device of the vehicle shown in FIG. 1. Endless tracks 1L and 1R are each trained over one of track frames 2L and 2R through a drive wheel 10 and a driven wheel 11.

A pair of support legs 3 of an elongated box shape which are hollow are secured as by welding to the left track frame 2L in positions spaced apart forwardly and rearwardly from the central portion of the track frame 2L.

Another pair of support legs 4 of an elongated box shape which are hollow are secured as by welding to the right track frame 2R in positions spaced apart forwardly and rearwardly from the central portion of the track frame 2R.

A lower frame 5 includes a pair of hollow, elongated box-shaped members 6 disposed in the front and rear and interconnected by connecting members 7. The hollow, elongaged box-shaped members 6 are of a size such that the support legs 3 and 4 can be inserted therein and maintained in intimate contact therewith.

The support legs 3 and 4 are each formed at one end portion with first, second and third bolt receiving holes 8a, 8b and 8c which are arranged in a manner to form a triangle. The elongated box-shaped members 6 are formed at each of opposite end portions with first, second, third, fourth and fifth bolt receiving holes 9a, 9b, 9c, 9d and 9e. The relative positions of the bolt receiving holes formed in the support legs 3 and 4 and the elongated box-shaped members 6 are as shown in FIG. 2.

More specifically, when the support legs 3 and 4 are inserted in the elongated box-shaped members 6 in such a manner that the forward end of each support leg is short of a stopper 12 by a distance l, the first, second and third bolt receiving holes 8a, 8b and 8c are indexed with the first, second and fourth bolt receiving holes 9a, 9b and 9d respectively. When the support legs 3 and 4 are inserted in the elongated box-shaped members 6 in such a manner that the forward end of each support leg abuts against the stopper 12, the first, second and third bolt receiving holes 8a, 8b and 8c are indexed with the second, third and fifth bolt receiving holes 9b, 9c and 9e respectively.

Bolts 13 are each inserted in one of the first, second and third bolt receiving holes 8a, 8b and 8c indexed with three of the bolt receiving holes 9a–9e and tightened, to clamp the elongated box-shaped members 6 against the support legs 3 and 4.

Thus the left and right support legs 3 and 4 can be connected to the elongated box-shaped members 6 in one of two positions: in one position the support legs 3 and 4 abuts against the stopper 12 and in the other position they are spaced apart from the stopper 12. Thus the spacing interval between the left and right endless tracks 1L and 1R or the vehicle body width can be increased or decreased. However, the frame structure of the prior art suffers the following disadvantages:

(1) The support legs 3 and 4 for the elongated box-shaped members 6 are connected at one end to the left and right track frames 2L and 2R and inserted at the other end in the elongated box-shaped members 6 of the lower frame 5. With this frame structure, it is necessary to machine with precise finished four surfaces or upper and lower surfaces and left and right surfaces of each of the support legs 3 and 4 (outer peripheral surfaces) and each of the elongated box-shaped members 6 (inner peripheral surfaces). This machining operation is time consuming and involves great expenses. Particularly, machining of the inner peripheral surfaces of the elongated box-shaped members 6 is troublesome and time consuming, and difficulties ae experienced in increasing the precision with which machining is effected.

(2) The elongated box-shaped members 6 each have the support legs 3 and 4 inserted in opposite ends thereof. Thus the opposite ends of each elongated box-shaped member 6 should be open. This construction is very low in strength with respect to torsion loads, so that it becomes necessary to increase the size of the cross-sectional area or increase the size of the cross-sectional area or inrease the thickness of plates of the member 6 to increase strength. Moreover, the elongated box-shaped member and the support legs overlap one another in part of them, thereby increasing weight. Thus an increase in weight caused by the need to increase strength and an increase in weight due to the presence of overlaps combine to cause a large increase in the weight of the frame structure, thereby increasing cost.

(3) FIG. 2 shows in a diagram the bending moment applied to the frame structure during operation with the lower frame 5 and the track frames 2L and 2R being interconnected. Assuming that a load F is equally divided into F/2 and F/2 which are each borne by one of the left and right track frames 2L and 2R, the bending moment would be maximized near the central portion of the track frames and minimized at opposite ends thereof as shown. In the frame structure shown in FIGS. 1 and 2, the elongated box-shaped members 6 are connected to the support legs 3 and 4 by bolts 13 in a position near the portion of the frame at which the bending moment is maximized, so that the need arises to increase the strength of the connections.

(4) As stated in paragraph (1), difficulties are encountered in increasing the precision with which the elongated box-shaped members 6 are finished, and this makes it necessary to provide a large clearance between sliding portions of the elongated box-shaped member 6 and the associated support legs 3 and 4. In this case, they are clamped together by the bolts 13 to prevent relative movements therebetween. However, loads would be applied to the bolts 13 by the weight of the vehicle body, reactions produced during operation and impact applied during travel, so that shearing, bending, tensile and other forces would act on the bolts 13. As a result, the bolts 13 would tend to be loosened or broken. When the bolts 13 are loosened or broken, relative movements would occur between the elongated box-shaped member 6 and the support legs 3 and 4 during operation or travel, so that the performance, stability and riding comfort of the vehicle would be adversely affected.

(5) As stated in paragraph (4), a clearance should be provided between the sliding portions of the elongated box-shaped member 6 and the support legs 3 and 4 and they should be clamped together by the bolts 13 to avoid relative movements therebetween. In this case, the bolts used should be increased in number and the clamping torque of the bolts should be increased greatly because the relative movements caused by a horizontal load in particular should be absorbed by friction between the elongated box-shaped member and the support legs. Thus clamping should be effected by using a wrench of large size and heavy weight or other similar tool. Being large and heavy, such a wrench is difficult to operate. Also it often happens that the clamping operation should be performed in places of inconvenience for operation. This increases the time required for effecting vehicle body width adjustments to about 5 hours in the case of a crawler vehicle of a bucket capacity of 2 m$^3$, for example.

Figure 4:
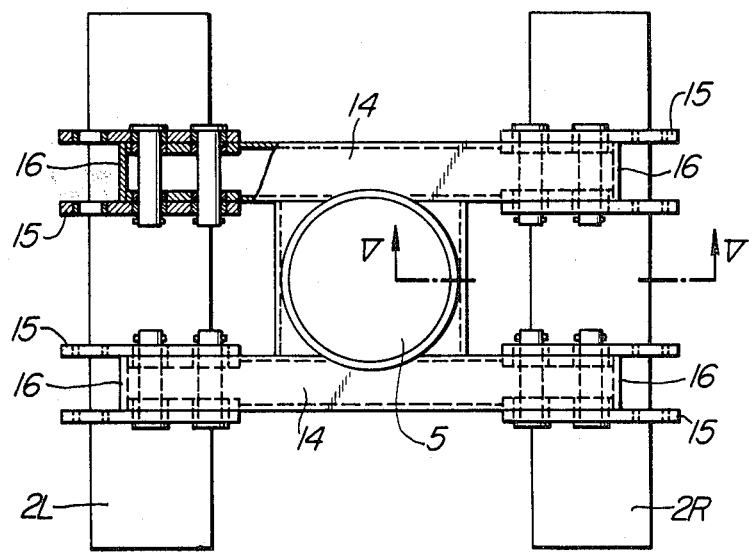
FIG. 4 is a plan view of the frame structure comprising one embodiment of the invention.
Figure 5:
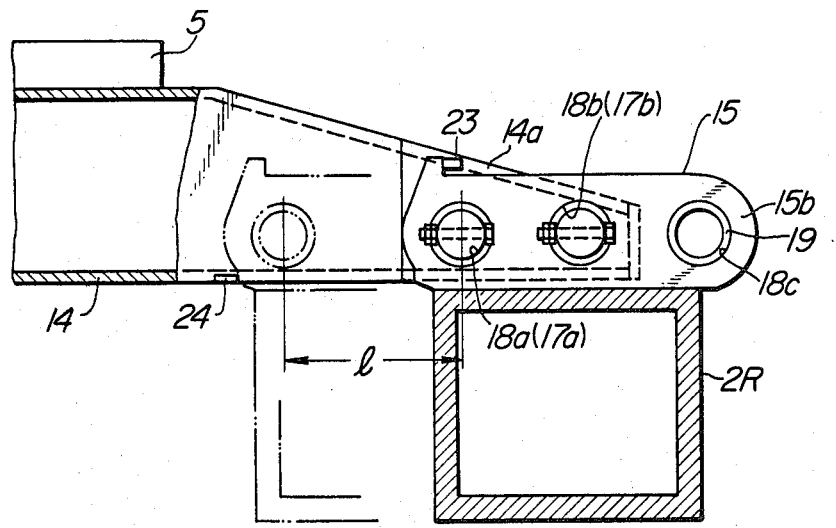
FIG. 5 is a side view, on an enlarged scale, of the essential portions of the frame structure as viewed along line V—V of FIG. 4.

One embodiment of the invention will now be described by referring to FIGS. 4-6. In FIGS. 4 and 5, parts similar to those shown in FIGS. 1 and 2 are designated by like reference characters.

As shown, the lower frame 5 includes a pair of beams 14 of an elongated box shape extending crosswise of the vehicle body. Bracket means 15 for connecting the beams 14 of the lower frame 5 to the left and right track frames 2L and 2R in positions spaced apart forwardly and rearwardly respectively of the central portion of the track frames 2L and 2R are secured as by welding to the upper surfaces of the left and right track frames 2L and 2R perpendicularly to the length of each track frame. Each beam 14 is closed at opposite ends 16 to provide a completely closed box construction which is strong against torsion loads. Each bracket means 15 comprises two vertically upwardly extending plates 15a and 15b disposed parallel to the beam 14 and spaced apart from each other a distance large enough to allow the beam 14 to be inserted therebetween without any gap. With this arrangement, the left and right outer sides of the beam 14 and the inner sides of the plates 15 have only to be machined, so that expenses for performing machining can be reduced while maintaining the finishes at a precision level.

Each beam 14 is formed at opposite end portions thereof with bosses 14a, and each boss 14a is formed on either side thereof with two horizontally arranged, pin receiving holes 17a and 17b spaced apart from each other by a distance l. The plates 15a and 15b of each bracket means 15 are each formed with three horizontally arranged, pin receiving holes 18a, 18b and 18c. A bush 19 is fitted in each of the pin receiving holes 17a, 17b, 18a, 18b, and 18c. In FIGS. 4-6, the pin receiving holes 17a and 17b of the beam 14 are indexed with the pin receiving holes 18a and 18b respectively of the plates 15a and 15b of each bracket means 15 on the left and right track frames 2L and 2R, and a pin 20 which can provide higher strength than a bolt is inserted in each indexed pin receiving holes and prevented from dislodging by a bolt 21 and a nut 22, when the crawler vehicle is in an operation mode. Each pin receiving hole is formed by machining which can be performed readily with a horizontal drilling machine with a precision finish. Alternatively, the plates 15a and 15b of each bracket means 15 may be machined beforehand and secured to the track frames 2L and 2R as by welding.

Figure 3:
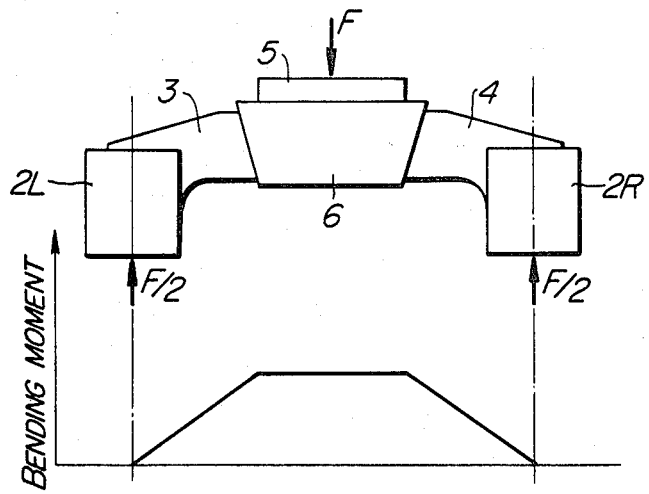
FIG. 3 is a diagrammatic drawing showing bending moment applied to the frame structure shown in FIG. 1 during operation with the lower frame and the pair of track frames being connected to one another.

The lower frame 5 is connected to the left and right track frames 2L and 2R in positions in which the bending moment is minimized as shown in FIG. 3 in the diagram. Thus the frame structure according to the invention can be designed to have a light weight without reducing strength.

Each beam 14 has stoppers 23 and 24 at each of opposite end portions thereof. When it is desired to switch the crawler vehicle from an operating mode shown in FIGS. 4-6 in which the vehicle body width is increased to a transportation mode in which the vehicle body width is decreased, the nuts 22 and bolts 21 are removed and the pins 20 are removed from the pin receiving holes 17a and 17b and 18a and 18b in connections between each beam 14 and each bracket means 15. Then, the left and right track frames 2L and 2R are moved inwardly a distance l crosswise of the vehicle body to positions in which, as shown in FIG. 5 in dash-and-dot lines, each bracket means 15 abuts against the stopper 24. When the left and right track frames 2L and 2R are each in the dash-and-dot line position shown in FIG. 5, the pin receiving holes 17a and 17b of each beam 14 are indexed with the pin receiving holes 18b and 18c of the bracket plates 15a and 15b respectively, and the pin 20 is inserted in each set of indexed holes and prevented from dislodging by the bolt 21 and nut 22.

Coversely, when the crawler vehicle is switched from a transportation mode to an operation mode, the aforesaid process is reversed. In this case, when each bracket means 15 abuts against the stopper 23, the pin receiving holes 17a and 17b of each beam 14 are brought into index with the pin receiving holes 18a and 18b respectively of each bracket means 15, as shown in FIGS. 4–6.

Figure 6:
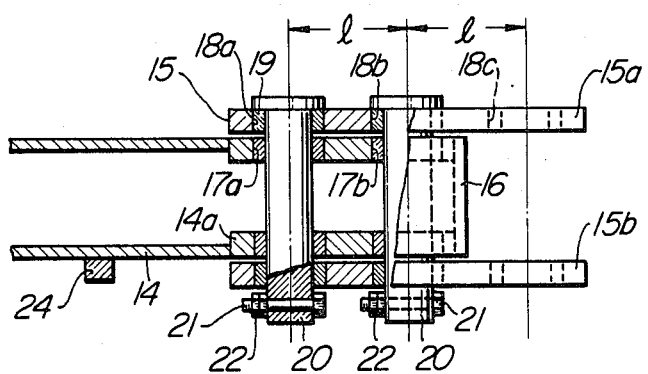
FIG. 6 is a plan view, with certain parts being shown in section, of the essential portions shown in FIG. 5.
Figure 7:
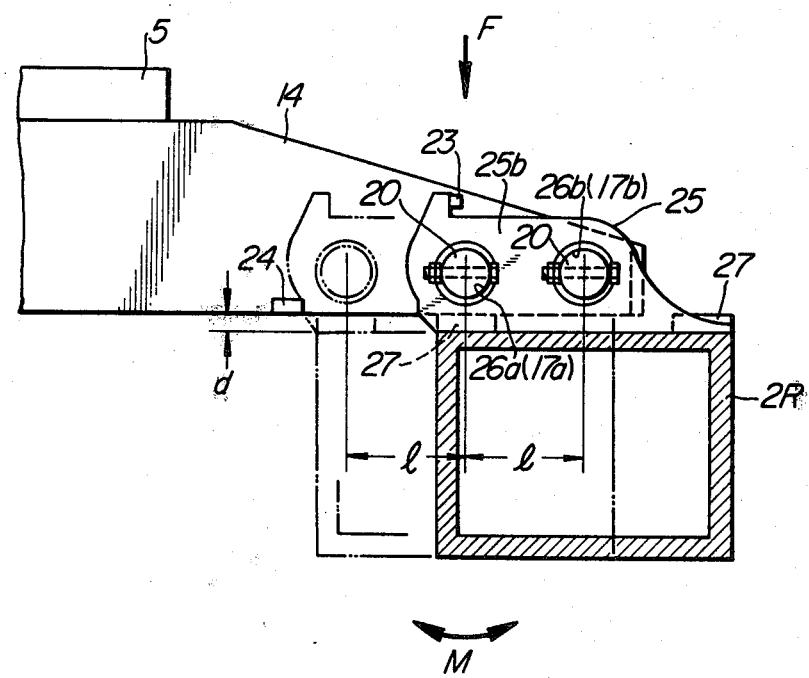
FIG. 7 is a view similar to FIG. 5 but showing another embodiment of the invention.

FIG. 7 shows another embodiment wherein parts similar or corresponding to those shown in FIGS. 4–6 are designated by like reference characters.

Each beam 14 of the lower frame 5 is formed on either side of each end portion thereof with two horizontally arranged, pin receiving holes 17a and 17b spaced apart from each other a distance l, like the beam 14 of the embodiment shown in FIGS. 4–6. Bracket means 25 are mounted on the upper surface of the left and right track frames 2L and 2R and arranged perpendicular to the length of the track frames. Like the bracket means 15 of the embodiment shown in FIGS. 4–6, each bracket means 25 includes two plates 25a and 25b (only one plate 25b is shown in FIG. 7). The bracket plates 25a and 25b are each formed with two horizontally arranged, pin receiving holes 26a and 26b spaced apart from each other a distance l. Two support plates 27 of a thickness slightly smaller than the gap d between the beam 14 of the lower frame 5 and each of the left and right track frames 2L and 2R are located between the two bracket plates 25a and 25b on the upper surface of each of the left and right track frames 2L and 2R and secured thereto as by welding in such a manner that the two support plates 27 are spaced apart from each other a suitable distance.

FIG. 7 shows the crawler vehicle in an operation mode in solid lines in which the vehicle body width is increased. In this condition, the pin receiving holes 17a and 17b of each beam 14 are indexed with the pin receiving holes 26a and 26b respectively of each bracket means 25. Like the embodiment shown in FIGS. 4–6, this embodiment also includes pins 20 inserted in each set of indexed pin receiving holes to connect the lower frame 5 to the left and right track frames 2L and 2R.

When the crawler vehicle shown in FIG. 7 is switched to a transportation mode in which the vehicle body width is decreased, the pins 20 are withdrawn from the connections and the left and right track frames 2L and 2R are moved inwardly crosswise of the vehicle body a distance l as indicated by dash-and-dot lines in FIG. 7. In this position, each bracket means 25 abuts against the stopper 24, and the pin receiving hole 17a is brought into index with the pin receiving hole 26b of each bracket means 25. Pin 20 is inserted in the indexed pin receiving holes so as to securely connect the lower frame 5 to the left and right track frames 2L and 2R.

By virtue of the aforesaid arrangement, a vertical load F and movement M applied to each connection between the lower frame 5 and each of the left and right track frames 2L and 2R are borne by the two pins 20, in the embodiment shown in FIG. 7. When the crawler vehicle is in a transportation mode (dash-and-dot line position), however, the vertical load F is borne by only one pin 20 and the moment M is borne by the contact between the two support plates 27 and the undersurface of each beam 14 of the lower frame 5.

In this embodiment, only two pin receiving holes are formed in each bracket means 25 on the left and right track frames 2L and 2R. This enables the bracket means 25 to be reduced in size, resulting in a reduction in cost. Moreover, the operation of changing the vehicle body width can be performed with ease.

The frame structure according to the present invention described in detail hereinabove offers the following advantages:

(1) Each beam of the lower frame is of a completely closed box construction in which the beam is closed at opposite ends, so that it has a high strength against torsion loads. The lower frame is connected to the track frames in positions where the bending moment is minimized, so that the frame structure can be designed to have a light weight without reducing strength.

(2) Portions that require machining are reduced in number, and those portions requiring machining can be readily machined, thereby facilitating fabrication of the frame structure.

(3) Sliding portions of each beam of the lower frame and each bracket means of the left and right track frames can be readily machined and machining can be performed with a high precision finish. This makes it posible to connect each beam to each bracket means by pins while minimizing the clearance therebetween, with the result that relative movements between the lower frame and the left and right track frames can be reduced. Thus the vehicle has increased strength, performance, stability and riding comfort.

(4) The arrangement that each beam is connected to each bracket means by pins while minimizing the clearance between the beam and the bracket means enables vehicle body width adjustments to be effected with greater ease and in a reduced period of time. The time required for effecting vehicle body width adjustments is about 2 hours in the case of a crawler vehicle with a bucket capacity of 2 m$^3$.

(5) The pins used for connecting the lower frame to the left and right track frames have high strength and solid in construction.

(6) To sum up, the frame structure according to the invention is simple in construction, sturdy, and low in production cost and enables vehicle body width adjustments to be readily effected.

What is claimed is:

1. A frame structure for a construction vehicle having a lower frame and a pair of track frames connected to the lower frame, said frame structure comprising:
   a pair of beams of an elongated box shape constituting a part of said lower frame and extending substantially horizontally crosswise of the vehicle;
   bracket means comprising a pair of free-standing plates secured to an upper surface of each of said track frames in a manner extending vertically upwardly therefrom and disposed parallel to said beams so as to closely receive each of the opposite end portions of each of said beams therebetween; and pin means for forming a connection between each end portion of said each beam and each pair of plates of said bracket means thereby to connect said lower frame to said track frames, said pin means comprising a plurality of removable pins extending through said plates and the beams received therebetween so as to fully bear the loads and movements imposed on said connection.

2. A frame structure as claimed in claim 1, wherein said each beam is closed at opposite ends thereof, whereby the torsional strength thereof is increased.

3. A frame structure as claimed in claim 2, wherein said pin means includes a plurality of horizontally arranged, pin receiving holes formed in said each end portion of said each beam and equidistantly spaced apart from one another, and a plurality of horizontally arranged, pin receiving holes formed in each plate of said bracket means and equidistantly spaced apart from one another with the same spacing interval as said pin receiving holes formed in said each beam, at least one of said removable pins being selectively inserted in at least one of said pin receiving holes of said beam and one of said pin receiving holes of each plate of said bracket means, said pin receiving holes of said each beam and the plates of said bracket means having said at least one removable pin inserted therein being adapted to be varied at least in part from each other thereby to allow the vehicle body width to be altered when the vehicle is switched between an operation mode and a transportation mode.

4. A frame structure as claimed in claim 3, wherein said pin receiving holes formed in said beam include two holes formed on either side of each end portion thereof and said pin receiving holes formed in said plates of the bracket means include three holes formed in each said plate.

5. A frame structure as claimed in claim 3, wherein said pin receiving holes formed in said beam include two holes formed on either side of each end portion thereof and said pin receiving holes formed in said bracket plates include two holes formed in each said bracket plate.

6. A frame structure as claimed in any one of the preceding claims, further comprising at least one support plate attached to the upper surface of said each track frame and interposed between said two bracket plates, said support plate having a thickness slightly smaller than the clearance between the upper surface of said track frame and the undersurface of said beam.

* * * * *